United States Patent
Leichsenring et al.

(10) Patent No.: US 11,085,538 B2
(45) Date of Patent: Aug. 10, 2021

(54) TRANSMISSION OF A MOTOR VEHICLE

(71) Applicant: ZF Friedrichshafen AG, Friedrichshafen (DE)

(72) Inventors: Horst Leichsenring, Friedrichshafen (DE); Georg Ege, Kressbronn (DE); Hermann Lanz, Frickingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/668,121

(22) Filed: Oct. 30, 2019

(65) Prior Publication Data
US 2020/0158239 A1    May 21, 2020

(30) Foreign Application Priority Data
Nov. 15, 2018 (DE) .................... 10 2018 219 528.5

(51) Int. Cl.
*F16H 61/00* (2006.01)
*F16H 63/34* (2006.01)
*B60K 17/28* (2006.01)

(52) U.S. Cl.
CPC ......... *F16H 63/3483* (2013.01); *B60K 17/28* (2013.01); *F16H 61/0009* (2013.01)

(58) Field of Classification Search
CPC ............. F16H 63/3483; F16H 61/0009; F16H 61/0206; B60K 17/28; B60K 25/06
See application file for complete search history.

(56) References Cited

U.S. PATENT DOCUMENTS

| 4,191,072 A | 3/1980 | Ehrlinger et al. |
| 5,599,247 A * | 2/1997 | Matsufuji .............. B60K 17/28 |
| | | 475/128 |

(Continued)

FOREIGN PATENT DOCUMENTS

| DE | 2656669 B1 | 10/1978 |
| DE | 19621201 A1 | 11/1997 |

(Continued)

OTHER PUBLICATIONS

German Search Report issued in corresponding German Patent Application No. 10 2018 219 528.5 dated Oct. 8, 2019.

*Primary Examiner* — David J Hlavka
(74) *Attorney, Agent, or Firm* — Finch & Maloney, PLLC; Michael J. Bujold (57) ABSTRACT

A transmission of a vehicle having a transmission housing which accommodates shifting elements. The transmission has a hydraulic control unit which supplies the shifting elements with hydraulic oil, and which has a valve housing and a duct plate. The valve housing accommodates valves, and the duct plate unit is connected to the transmission housing and contains hydraulic ducts which communicate with hydraulic ducts of the transmission housing, to supply hydraulic oil to the shifting elements. The transmission has a transmission-side power-take-off via which mechanical power can be drawn from the transmission. The transmission has a transmission-internal, controllable clutch for the transmission-side power-take-off, by which the transmission-side power-take-off can be coupled to a transmission shaft to enable mechanical power to be drawn from the transmission shaft, and the transmission-internal, controllable clutch for the transmission-side power-take-off can be supplied from the hydraulic control unit with hydraulic oil for actuation of the clutch.

11 Claims, 5 Drawing Sheets

(56) References Cited

U.S. PATENT DOCUMENTS

| | | | |
|---|---|---|---|
| 6,487,924 B2 * | 12/2002 | Matsufuji | F16H 37/043 |
| | | | 192/48.614 |
| 6,881,175 B2 | 4/2005 | Loibl | |
| 8,033,106 B2 | 10/2011 | Gierer et al. | |
| 8,806,975 B2 | 8/2014 | Schneider et al. | |
| 9,381,808 B2 | 7/2016 | Sauter et al. | |
| 9,809,205 B2 | 11/2017 | Förster et al. | |
| 2019/0193560 A1 | 6/2019 | Trübenbach et al. | |

FOREIGN PATENT DOCUMENTS

| | | |
|---|---|---|
| DE | 10028350 A1 | 12/2001 |
| DE | 102005029567 A1 | 2/2006 |
| DE | 10 2007 050 802 A1 | 4/2009 |
| DE | 102010002724 A1 | 9/2011 |
| DE | 102013215249 A1 | 2/2015 |
| DE | 102014002817 A1 | 9/2015 |
| DE | 102016212209 A1 | 1/2018 |

* cited by examiner

TRANSMISSION OF A MOTOR VEHICLE

This application claims priority from German patent application serial no. 10 2018 219 528.5 filed Nov. 15, 2018.

FIELD OF THE INVENTION

The invention relates to a transmission of a motor vehicle.

BACKGROUND OF THE INVENTION

Motor vehicle transmissions known from practice, which provide several gears, have a plurality of shifting elements. The shifting elements of the transmission can be interlocking shifting elements such as claw-type shifting elements and/or frictional shifting elements such as clutches or brakes. In every engaged frictional gear of such a transmission a first defined number of shifting elements of the transmission are closed and a second defined number of shifting elements of the transmission are open. When a gearshift is carried out from a current gear to a target gear, at least one previously closed shifting element of the transmission is opened and at least one other, previously open shifting element of the transmission is closed. The shifting elements of the transmission are positioned in a transmission housing.

Motor vehicle transmissions known from practice also have a hydraulic control unit. Starting from the hydraulic control unit the shifting elements of the transmission can be supplied with hydraulic oil. A hydraulic control unit has a valve housing and a duct plate. The valve housing of the hydraulic control unit accommodates valves. The duct plate of the hydraulic control unit, by way of which the hydraulic control unit is connected to the transmission housing, comprises hydraulic ducts which communicate with hydraulic ducts of the transmission housing in order, via the hydraulic ducts of the duct plate and the transmission housing, ultimately to supply the shifting elements of the transmission with hydraulic oil starting from the valves of the hydraulic control unit. Accordingly the valves of the valve housing communicate with the hydraulic ducts of the duct plate. Between the valve housing of the hydraulic control unit and the duct plate an intermediate sheet can be positioned, which has openings such that via the openings of the intermediate sheet the valves of the valve housing communicate with the hydraulic ducts of the duct plate.

From DE 10 2007 050 802 A1 a transmission control unit of a transmission of a motor vehicle is known, in particular a hydraulic control schema of the hydraulic control unit of the transmission. In that case the hydraulic control unit comprises a plurality of valves, among others a system pressure valve, several pilot control valves, several regulating valves, several shifting valves, a position valve and a parking lock valve, wherein the parking lock valve serves to control a parking lock cylinder accommodated in the hydraulic control unit. By controlling the parking lock cylinder a parking lock can be hydraulically released or engaged.

From practice it is also already known to draw mechanical power from a power-take-off of a motor vehicle. In motor vehicles known from practice such power-take-offs are in the form of separate assemblies, preferably built onto the transmission, and can be coupled selectively to a shaft by means of a clutch external to the transmission in order to draw mechanical power, namely when the power-take-off is coupled to the shaft concerned by the transmission-external clutch. The control of this transmission-external clutch requires a further hydraulic control unit.

SUMMARY OF THE INVENTION

There is a need for a motor vehicle transmission with a power-take-off having a simple structure. That objective is achieved by a transmission according to the independent claim(s).

The transmission according to the invention has a transmission housing that accommodates a plurality of shifting elements.

The transmission according to the invention comprises a hydraulic control unit from which the shifting elements of the transmission can be supplied with hydraulic oil. The hydraulic control unit comprises a valve housing and a duct plate. The valve housing of the hydraulic control unit accommodates valves. The duct plate of the hydraulic control unit is connected to the transmission housing and has hydraulic ducts that communicate with hydraulic ducts of the transmission housing in order to supply hydraulic oil to the shifting elements of the transmission via the hydraulic ducts of the duct plate and those of the transmission housing.

The transmission according to the invention has a power-take-off on the transmission side, by way of which mechanical power can be drawn from the transmission.

The transmission according to the invention has a transmission-internal, controllable clutch for the transmission-side power-take-off, by means of which the transmission-side power-take-off can be coupled to a shaft of the transmission in order to draw mechanical power from the transmission. The transmission-internal, controllable clutch for the transmission-side power-take-off can be supplied from the hydraulic control unit with hydraulic oil for its actuation.

Thus, in the transmission according to the invention a transmission-side power-take-off can be actuated by way of a transmission-internal controllable clutch. The transmission-internal controllable clutch for the transmission-side power-take-off can be supplied starting from the hydraulic control unit, which serves to actuate the shifting elements of the transmission, so as to be able to actuate the clutch for the transmission-side power-take-off. In this way a transmission with a simplified structure can be provided. The controllable clutch for the transmission-side power-take-off is integrated in the transmission, so no separate clutch has to be incorporated. The supply of this transmission-internal clutch for the transmission-side power-take-off takes place from the hydraulic control unit. No separate hydraulic control unit for actuating the clutch for the transmission-side power-take-off is required.

The valve housing of the hydraulic control unit accommodates a number of valves, in particular a system pressure valve, pilot control valves, regulating valves, shifting valves, a position valve, a pressure-limiting valve and a parking lock valve, but no parking lock cylinder. In a first variant the parking lock valve, in combination with an adapter in place of the parking lock cylinder, serves to actuate the transmission-internal controllable clutch for the transmission-side power-take-off. According to an alternative, second variant the parking lock valve serves to actuate the transmission-internal controllable clutch for the transmission-side power-take-off, but in this case without an adapter.

Accordingly, to actuate the clutch the parking lock valve is used. The parking lock cylinder, which in hydraulic control units for a transmission with a parking lock is accommodated in the valve housing of the hydraulic control unit, is not needed according to the present invention but can if necessary be replaced by an adapter. In any case, however, the parking lock cylinder is omitted. A hydraulic control unit designed for controlling a transmission with a parking lock, is accordingly modified in such manner that although as before it serves to actuate the shifting elements of the transmission, it no longer actuates a now omitted parking lock, but rather, it actuates and therefore shifts the transmission-internal clutch for the transmission-side power-take-off. Since the transmission no longer uses a parking lock, the transmission preferably comprises a parking brake. In contrast to a parking lock, a parking brake does not act upon the drive output of the transmission but instead, either on a cardan shaft downstream from the transmission or directly on the wheels of the motor vehicle.

BRIEF DESCRIPTION OF THE DRAWINGS

Preferred further developments emerge from the subordinate claims and the description that follows. Example embodiments of the invention, to which it is not limited, are explained in greater detail with reference to the drawings, which show:

DETAILED DESCRIPTION OF THE PREFERRED EMBODIMENTS

Figure 1:
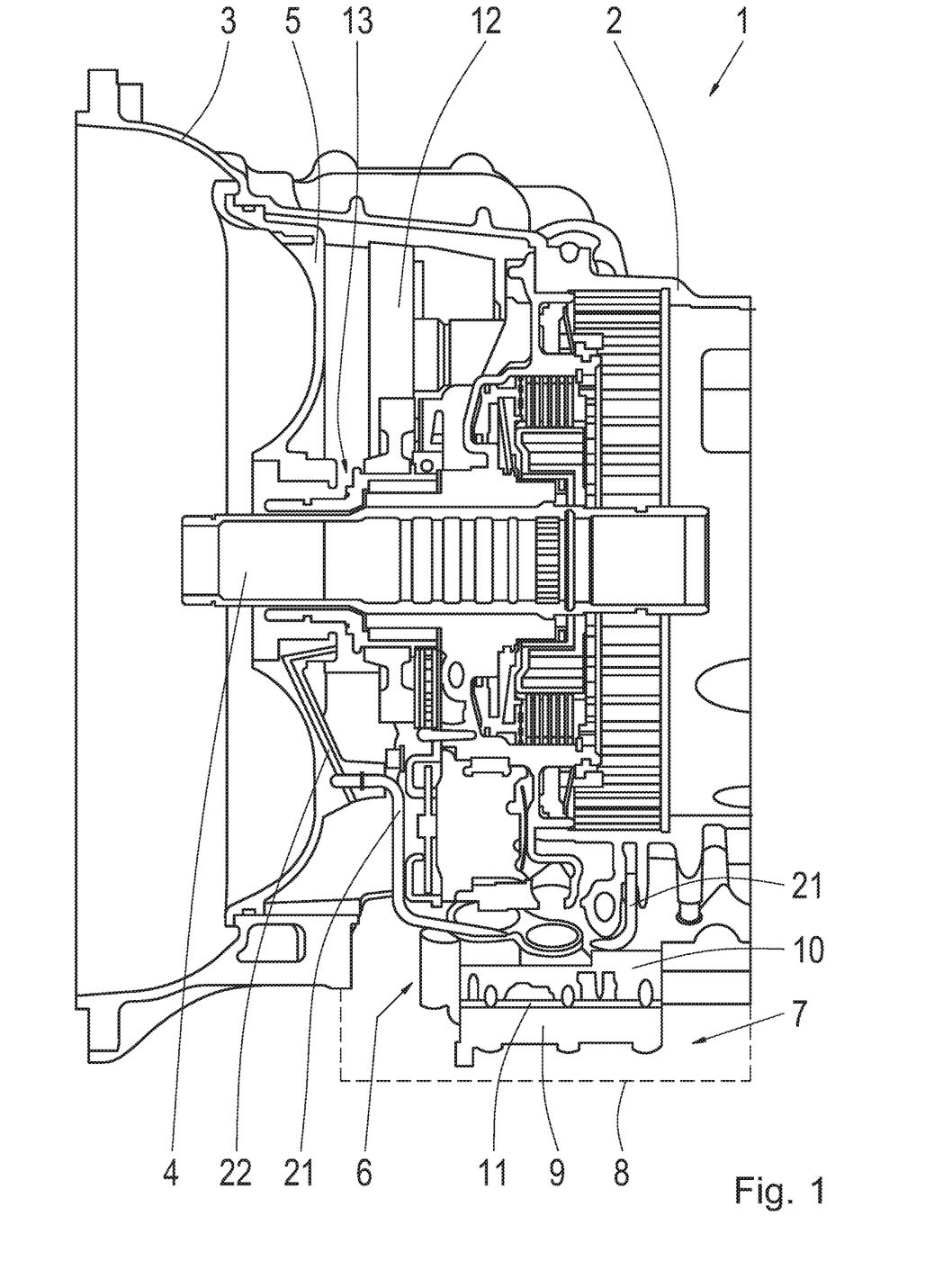
FIG. 1: A partial cross-section through a motor vehicle transmission according to the invention, according to a first example embodiment of the invention.
Figure 2:
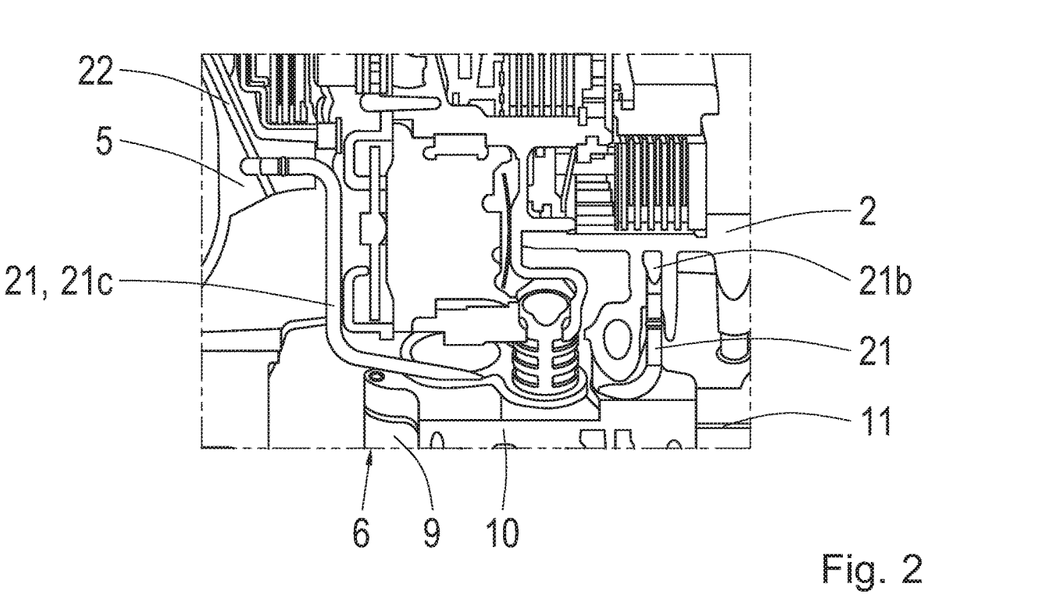
FIG. 2: A detail of FIG. 1.
Figure 3:
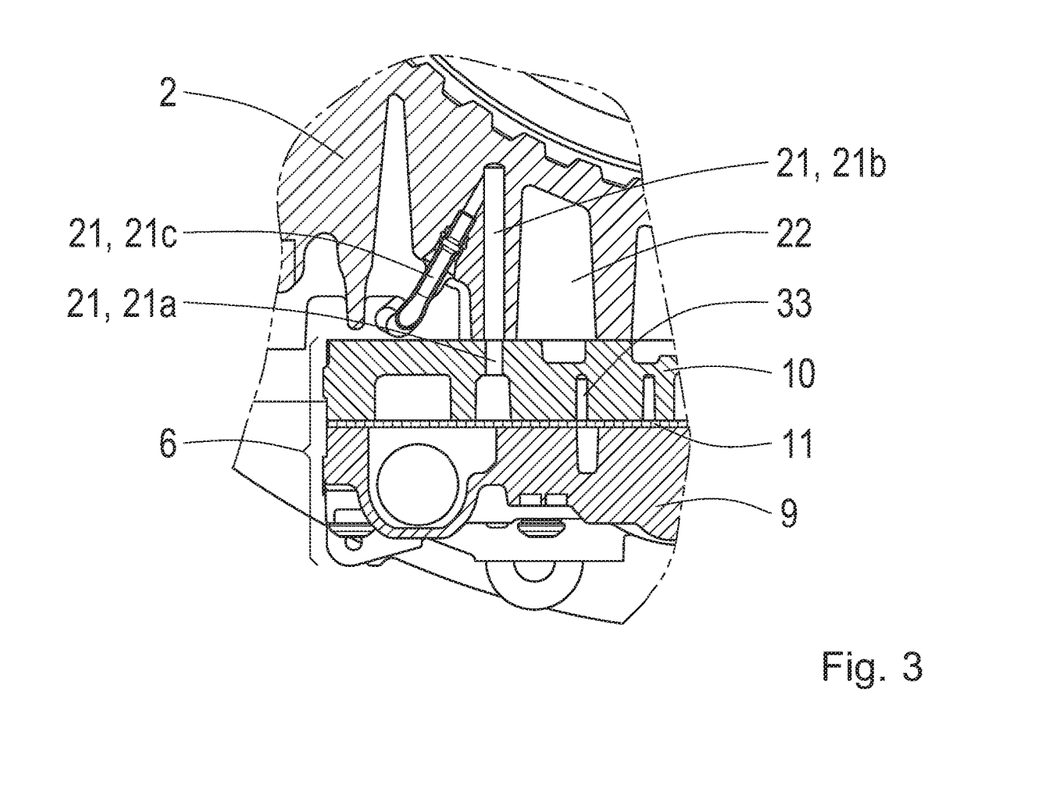
FIG. 3: A further detail of FIG. 1.
Figure 4:
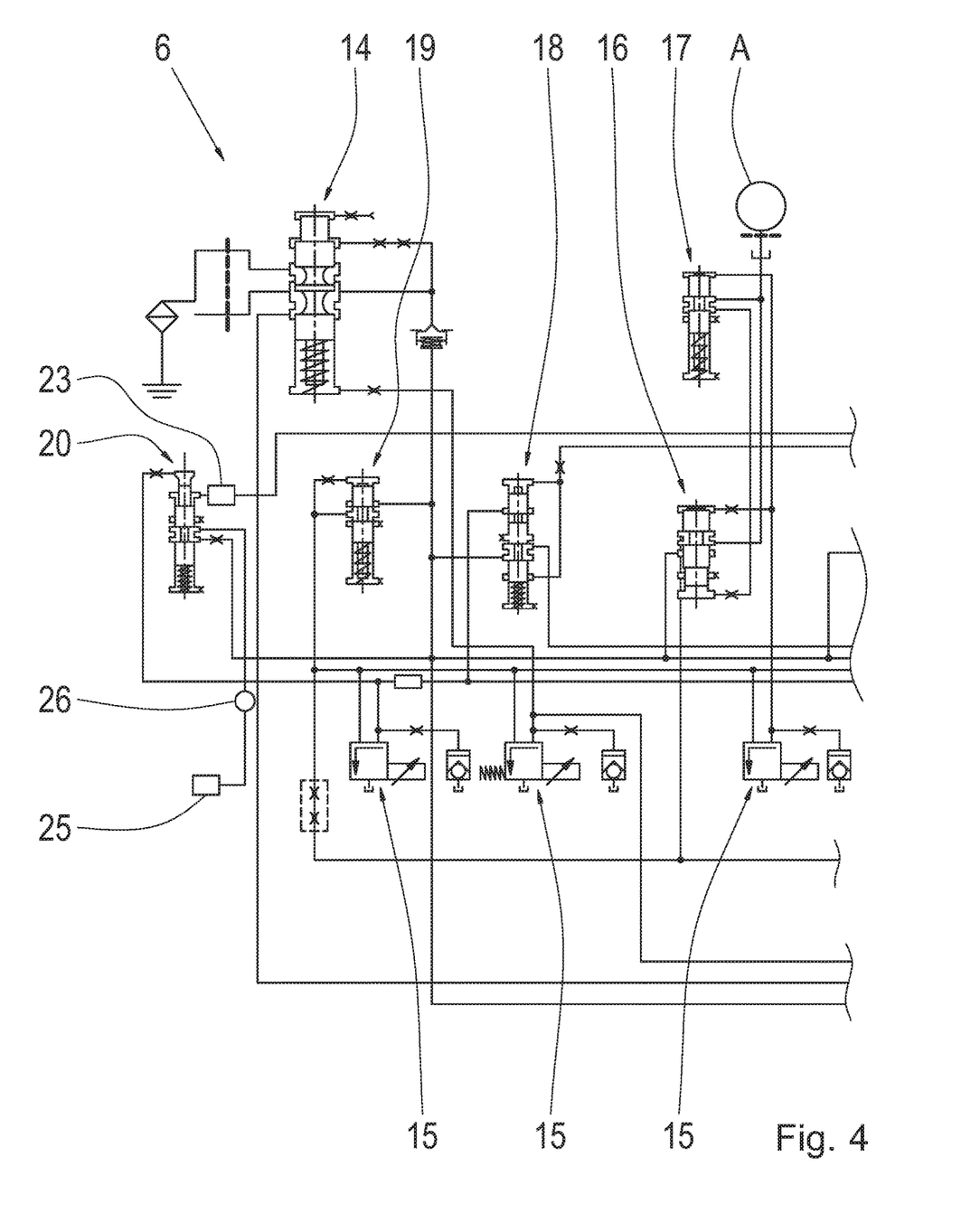
FIG. 4: A section of a hydraulic schema of a hydraulic control unit of the transmission shown in FIG. 1.

FIG. 1 shows a partial cross-section through a motor vehicle transmission according to the invention, corresponding to a first example embodiment of the invention. FIGS. 2 to 4 show details of this first example embodiment.

The transmission 1 has a transmission housing 2, in which a plurality of shifting elements of the transmission 1 (not shown in detail) are accommodated. The shifting elements can be interlocking shifting elements such as claw-type elements, or frictional shifting elements such as clutches and brakes. In each engaged gear a first defined number of shifting elements of the transmission 1 are open and a second defined number of shifting elements of the transmission 1 are closed. To carry out a gearshift at least one previously closed shifting element is opened and at least one previously open shifting element is closed.

Part of the transmission housing 2 is a so-termed transmission bell 3, which serves to connect the transmission 1 to a drive aggregate. In the transmission bell 3, in particular a separator clutch (not shown) can be arranged, with the help of which a transmission input shaft 4 of the transmission 2 can be connected to a drive aggregate shaft. Starting from the transmission bell 3, the transmission input shaft 4 extends into the transmission housing 2 and thus through a cover 5, which is also known as a centering plate.

To actuate the shifting elements of the transmission 1 (not shown in detail), there is a hydraulic control unit 6 of the transmission 1. The hydraulic control unit 6 is connected to the transmission housing 2, in particular on an underside of the transmission housing 2. The hydraulic control unit 6 is positioned in an oil space 7 which is delimited by the transmission housing 2 and an oil sump 8 connected to the transmission housing 2. In FIG. 1 the oil sump 8 is indicated only by a broken line.

The hydraulic control unit 6 has a valve housing 9, a duct plate 10 and an intermediate sheet 11 arranged between the valve housing 9 and the duct plate 10.

The valve housing 9 of the hydraulic control unit 6 accommodates a plurality of valves, which serve in particular for the hydraulic actuation specifically of the shifting elements of the transmission.

The duct plate 10 of the hydraulic control unit 6, by way of which the hydraulic control unit 6 is connected to the transmission housing 2, contains hydraulic ducts 33 that communicate with hydraulic ducts 22 of the transmission housing 2. Via the communicating hydraulic ducts 33 of the duct plate 10 of the hydraulic control unit 6 and the hydraulic ducts 22 of the transmission housing 2, the shifting elements of the transmission 1 can be supplied with hydraulic oil in order, depending on the hydraulic oil supply, either to close the shifting elements or keep them closed, or to open them and keep them open.

By virtue of the intermediate sheet 11 positioned between the valve housing 9 and the duct plate 10, the flow path of the oil starting from the valves of the valve housing 9 into the hydraulic ducts 33 of the duct plate 10 can be defined. For this, the intermediate sheet 11 has apertures at defined positions, by way of which, starting from the valves of the valve housing 9, the oil can ultimately flow into the hydraulic ducts 33 of the duct plate 10, and this in a manner that depends on the opening position of the valves accommodated by the valve housing 9 of the hydraulic control unit 6.

The transmission 1 according to the invention has a power-take-off 12 on the transmission side, by means of which mechanical power can be drawn from the transmission 1. The mechanical power drawn or branched off from the transmission 1 via the power-take-off 12 serves to drive an auxiliary aggregate such as a winch or the like, and is therefore not transmitted to the wheels of the motor vehicle as drive power.

To couple the transmission-side power-take-off 12 selectively to a transmission shaft, namely when mechanical power is to be drawn from the transmission 1 via the transmission-side power-take-off 12, the transmission 1 has a transmission-internal, controlled clutch 13 for the transmission-side power-take-off 12. In the example embodiment shown, when the transmission-internal clutch 13 for the power-take-off 12 is closed the power-take-off 12 is coupled to the transmission input shaft 4 of the transmission 1.

In the transmission 1 according to the invention, starting from the hydraulic control unit 6, the transmission-internal, controllable clutch for the transmission-side power-take-off 12 can be supplied with hydraulic oil for the control of the clutch 13.

Thus, the transmission 1 has a transmission-side power-take-off 12 and a transmission-internal, controllable clutch 13 for the power-take-off 12, which, starting from the hydraulic control unit 6 that serves to control the shifting elements of the transmission 1, can be supplied with hydraulic oil for its control. Thus, neither is a transmission-external clutch needed for controlling the power-take-off 12, nor is a separate hydraulic control unit needed.

The valve housing 9 of the hydraulic control unit 6 accommodates a plurality of valves, namely a system pressure valve 14, pilot control valves 15, regulating valves 16, switching valves 17, a position valve 18, a pressure-limiting valve 19 and a parking lock valve 20.

FIG. 4, which shows a hydraulic switching plan of the hydraulic control unit 6, shows some of these valves, namely the system pressure valve 14, the pressure-limiting valve 19, the position valve 18, the parking lock valve 20, some pilot control valves 15, and for one of the shifting elements of the transmission, which is identified in FIG. 4 by the letter A, also the switching valve 17 and the regulating valve 16. In relation to the valves shown, FIG. 4 corresponds to an extract from the hydraulic control schema of the hydraulic control unit known from DE 10 2007 050 802 A1. For other shifting elements, further pilot control valves 15, regulating valves 16 and switching valves 17 are provided.

As explained above, the hydraulic control unit 6 comprises the parking lock valve 20 and is therefore designed, in itself, for the control of a parking lock cylinder. In the transmission 1 according to the invention, the parking lock cylinder is omitted in the hydraulic control unit 6. The parking lock valve 20 of the hydraulic control unit 6 serves to control the transmission-internal, controllable clutch 13 for the transmission-side power-take-off 12.

In this case, in the example embodiment shown in FIGS. 1 to 4 a hydraulic oil line 21, via which the transmission-internal, controllable clutch 13 for the transmission-side power-take-off 12 can be supplied with hydraulic oil, extends starting from the hydraulic control unit 6 in the direction toward the transmission-internal, controllable clutch 13, partly within the duct plate 10, partly within the transmission housing 2 and partly within the oil space 7 of the transmission 1 delimited by the transmission housing 2 and the oil sump 8 in the direction toward the cover 5, also called the centering plate.

FIG. 3 shows that section of the hydraulic oil line 21 which extends within the duct plate 10 of the hydraulic control unit 6 or is formed by the duct plate 10, also identified by the index 21a. That section of the hydraulic oil line which extends within the transmission housing 2 or is formed by the transmission housing 2, is additionally identified in FIG. 3 by the index 21b. As shown in the figure, the section 21a of the hydraulic oil line merges into the section 21b of the hydraulic oil line 21. The section of the hydraulic oil line 21 that extends from the transmission housing 2 in the direction toward the cover 5 within the oil space 7 is identified by the index 21c.

Within the cover 5 extends a bore which continues the section 21c of the hydraulic oil line 21 and by way of which, finally, the oil supplied by the hydraulic control unit 6 for actuating the clutch 13 for the power-take-off 12 can be delivered to the clutch 13.

As already mentioned above, the hydraulic control unit 6 already known in itself, which as such is designed for controlling the parking lock, can be used for actuating the clutch 13 for the power-take-off 12. The parking lock cylinder, however, is omitted so that the parking lock valve 20 is used for controlling the clutch 13.

FIG. 4, which shows an extract from the hydraulic switching plan in DE 10 2007 050 802 A1, visualizes modifications that have to be carried out to the hydraulic control unit 6 for that purpose. Those modifications are indicated in FIG. 4 by the blocks 23, 24 and 25. The blocks 23, 24 and 25, which are rectangular in FIG. 4, visualize interruptions in existing hydraulic oil lines of the hydraulic control unit 6. These interruptions 23, 24, 25 can be produced simply by closing openings in the intermediate sheet 11. Thus, the blocks 23, 24, 25 are intermediate sheet closures. Thereby, connections between the valves in the valve housing 9 of the hydraulic control unit 6 and hydraulic ducts 33 in the duct plate 10 of the hydraulic control unit 6 are interrupted. In block 26, which is shown as a circle in FIG. 4, an additional aperture or opening is made in the intermediate sheet 11 in order to deliver hydraulic oil starting from the parking lock valve 20 to the clutch 13. Thus, the block 26 is an intermediate sheet aperture. If necessary there can also be such an aperture in the duct plate 10, in order to convey the oil from the duct plate 10 to the transmission housing 2. Where precisely such closures and apertures are to be made in the intermediate sheet 11 depends on the specific layout of the hydraulic control unit 6 and can if necessary be adapted by those with expertise in the field.

FIGS. 5, 6, 7 and 8 show details of a transmission according to the invention which represents a second example embodiment of the invention; to avoid unnecessary repetition, the same indexes are used to denote the same assemblies as in the example embodiment shown in FIGS. 1 to 4. For the example embodiment of FIGS. 5 to 8, only such details are described by which the example embodiment of FIGS. 5 to 8 differs from the example embodiment of FIGS. 1 to 4. All other design features also apply to the example embodiment of FIGS. 5 to 8.

Figure 5:
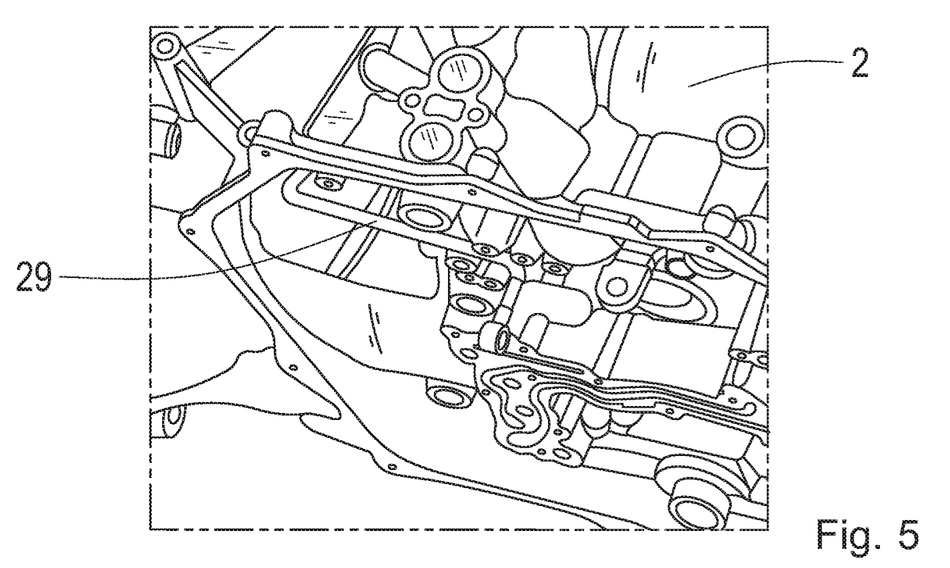
FIG. 5: A section of a motor vehicle transmission according to the invention, according to a second example embodiment of the invention.
Figure 6:
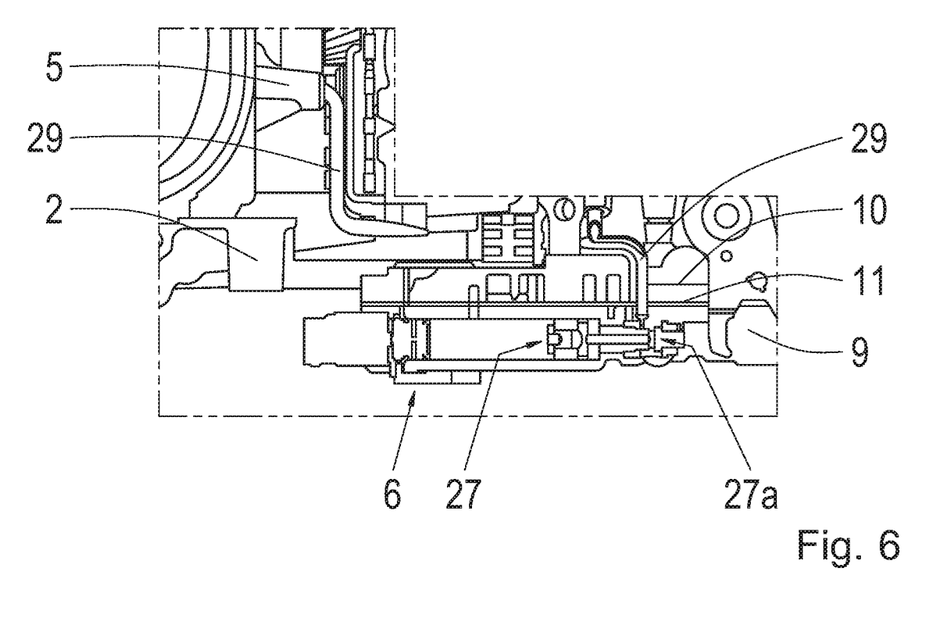
FIG. 6: A partial cross-section through the transmission shown in FIG. 5.

In the transmission of FIGS. 5 to 6 too, the controllable clutch 13 of the transmission 1 for the transmission-side power-take-off 12 is actuated with hydraulic oil by way of the hydraulic control unit 6, which again accommodates a plurality of valves as described above.

Again, in the example embodiment of FIGS. 5 to 8 there is no parking lock cylinder, which is replaced by an adapter 27 so that the parking lock valve 20, in combination with the adapter 27, serves to control the transmission-internal, controllable clutch 13 for the transmission-side power-take-off 12.

Figure 7:
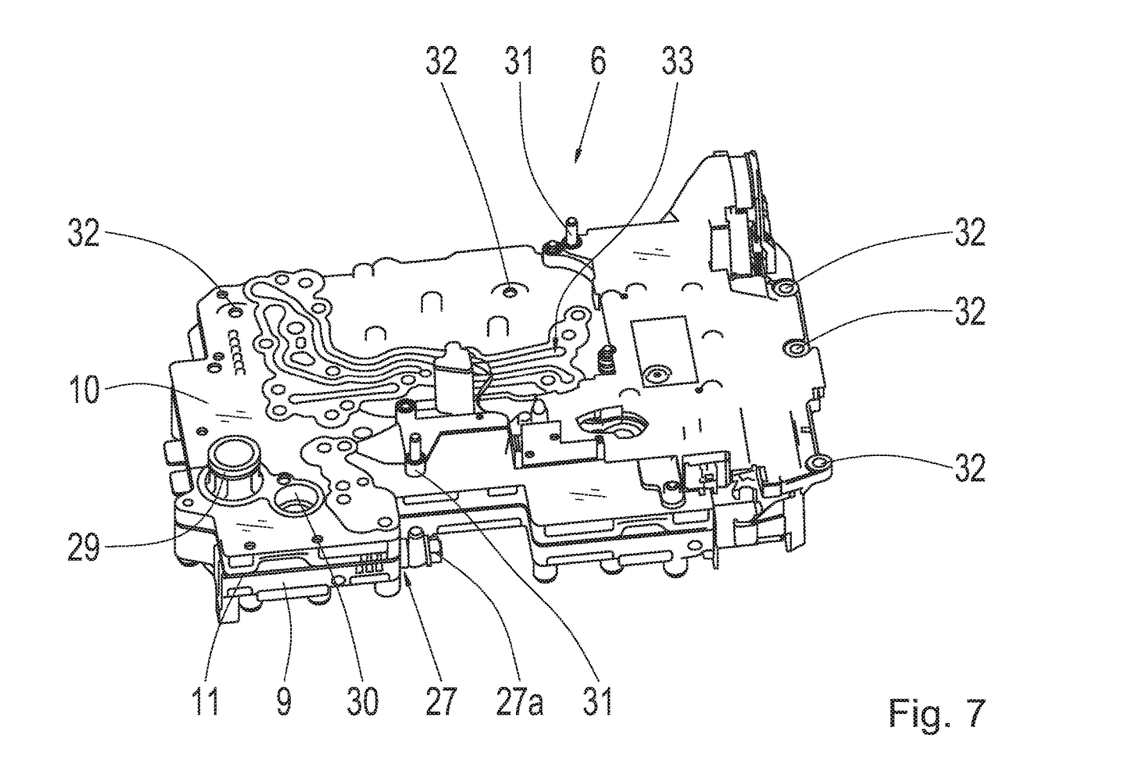
FIG. 7: A perspective view of a hydraulic control unit of the transmission shown in FIGS. 5 and 6.
Figure 8:
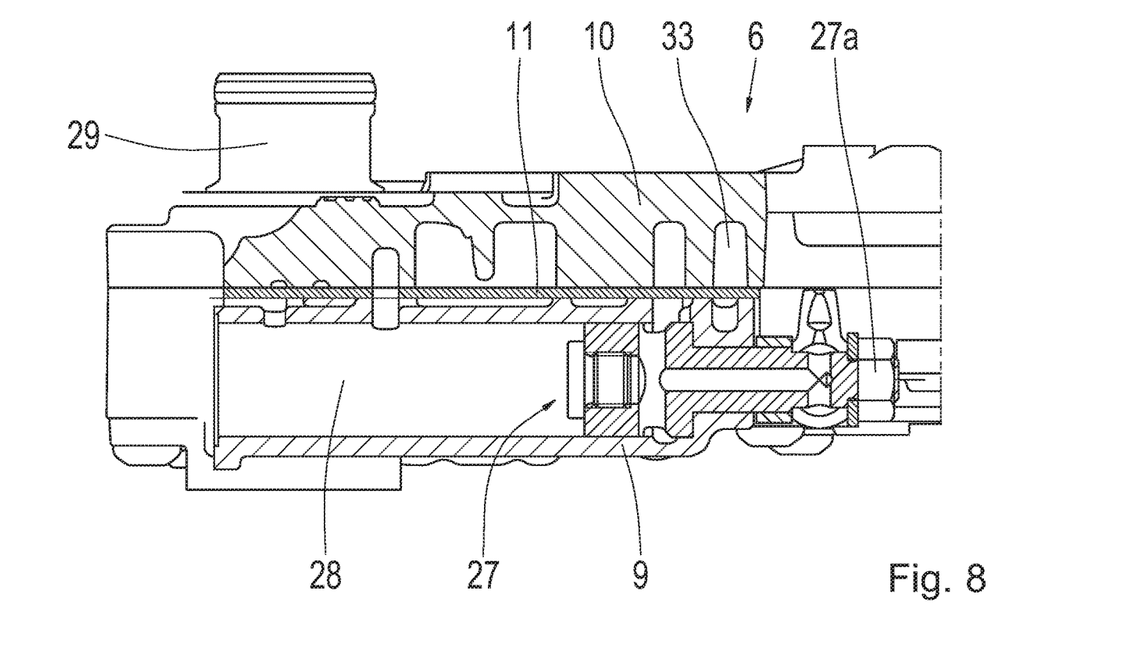
FIG. 8: A partial cross-section through the hydraulic control unit shown in FIG. 7.

The adapter 27 is located in a chamber 28 of the valve housing 9 of the hydraulic control unit 6, which as such serves to accommodate the no-longer-present parking lock cylinder, in such manner that a section 27a of the adapter 27 projects out of the chamber 28 so that this section 27a protrudes relative to the contour of the hydraulic control unit 6.

To this section 27a of the adapter 27 is then connected a hydraulic oil line 29 in order to deliver the hydraulic oil from the hydraulic control unit 6 in the direction toward the clutch 13 for the actuation of the clutch 13, such that this hydraulic oil line 29 extends completely outside the duct plate 10 of the hydraulic control unit 6 and outside the transmission housing 2 in the direction toward the cover 5, and therefore runs completely within the oil space 7 defined by the transmission housing 2 and the oil sump 8. The hydraulic oil line 29 is shown in FIGS. 5 and 6.

In the variant shown in FIGS. 5 to 8, in which the parking lock cylinder has been replaced by the adapter 27, no adaptation of the intermediate sheet 11 and perhaps of the duct plate 10 is necessary. The interruptions 23, 24 and 25 in the hydraulic lines and the intermediate sheet closures can therefore be omitted, as also can the aperture 26. Thus, in contrast to the example embodiment of FIGS. 1 to 4, the intermediate sheet 11 in the example embodiment of FIGS. 5 to 8 does not need any modification or adaptation.

Although not significant for the invention as such, let it be mentioned at this point that in addition to the assemblies of the hydraulic control unit 6 mentioned, FIGS. 7 and 8 show further assemblies, namely a suction tube 29 and a pressure connection 30 for a hydraulic oil pump to be connected to the hydraulic control unit 6, centering pins 31 for centering the hydraulic control unit 6 on the transmission housing 2 and apertures 32 for the passage of fixing bolts which serve to fix the hydraulic control unit 6 onto the transmission housing 2 of the transmission 1.

Thus, the invention proposes a transmission 1 of a motor vehicle, which comprises a transmission-side, transmission-internal power-take-off 12 with a transmission-internal, controllable clutch 13 for the actuation of the power-take-off 12. This transmission-internal, controllable clutch for the power-take-off 12 can be supplied with hydraulic oil from the hydraulic control unit 6 which serves to control the shifting elements of the transmission and, as such, to control a parking lock cylinder of the transmission 1. In this case the parking lock cylinder is omitted so that the parking lock valve 20 is used for actuating the controllable clutch 13 for the power-take-off 12.

Accordingly, the transmission 1 does not use a parking lock, but rather, a parking brake that acts either on a cardan shaft downstream from the transmission, or directly on wheels of the motor vehicle.

INDEXES

1 Transmission
2 Transmission housing
3 Clutch bell
4 Transmission input shaft
5 Cover
6 Hydraulic control unit
7 Oil space
8 Oil sump
9 Valve housing
10 Duct plate
11 Intermediate sheet
12 Power-take-off
13 Clutch
14 System pressure valve
15 Pilot control valve
16 Regulating valve
17 Switching valve
18 Positioning valve
19 Pressure-limiting valve
20 Parking lock valve
21 Hydraulic oil line
21*a* Section
21*b* Section
21*c* Section
22 Hydraulic duct
23 Intermediate sheet closure
24 Intermediate sheet closure
25 Intermediate sheet closure
26 Intermediate sheet aperture
27 Adapter
27*a* Section
28 Chamber
29 Hydraulic oil line
30 Pressure connection
31 Centering pin
32 Apertures
33 Hydraulic oil duct

The invention claimed is:

1. A transmission of a motor vehicle, the transmission comprising:
   a transmission housing accommodating a plurality of shifting elements,
   a hydraulic control unit from which the shifting elements of the transmission being supplied with hydraulic oil and which comprises a valve housing and a duct plate,
   the valve housing of the hydraulic control unit accommodating valves,
   the duct plate of the hydraulic control unit being connected to the transmission housing and containing hydraulic ducts which communicate with hydraulic ducts of the transmission housing for supplying the shifting elements of the transmission with hydraulic oil by way of the hydraulic ducts of the duct plate and the transmission housing,
   a power-take-off, on a transmission side, by which mechanical power can be drawn from the transmission,
   a transmission-internal, controllable clutch for the transmission-side power-take-off by which the transmission-side power-take-off being couplable to a transmission shaft to draw mechanical power, and
   the transmission-internal, controllable clutch, for the transmission-side power-take-off, being supplied with hydraulic oil from the hydraulic control unit for actuating the clutch.

2. The transmission according to claim 1, wherein the valve housing of the hydraulic control unit accommodates a system pressure valve, a pilot control valve, a regulating valve, a switching valve, a position valve, a pressure-limiting valve and a parking lock valve, and is void of a parking lock cylinder,
   the parking lock valve, in combination with an adapter, controls the transmission-internal, controllable clutch for the transmission-side power-take-off.

3. The transmission according to claim 2, wherein a hydraulic oil line supplies the transmission-internal, controllable clutch for the transmission-side power-take-off with hydraulic oil and extends, starting from the adapter, in a direction toward the transmission-internal, controllable clutch, completely outside the duct plate of the hydraulic control unit.

4. The transmission according to claim 3, wherein the hydraulic line (29) by way of which the transmission-internal, controllable clutch for the transmission-side power-take-off can be supplied with hydraulic oil extends, starting from the adapter, in a direction toward either a cover or a centering plate of the transmission.

5. The transmission according to claim 3, wherein the hydraulic line, by way of which the transmission-internal, controllable clutch for the transmission-side power-take-off is supplied with hydraulic oil, runs within an oil space delimited by the transmission housing and an oil sump, in which the hydraulic control unit is arranged.

6. The transmission according to claim 1, wherein the valve housing of the hydraulic control unit accommodates a system pressure valve, a pilot control valve, a regulating valve, a switching valve, a position valve, a pressure-limiting valve and a parking lock valve, and is void of a parking lock cylinder, and
   the parking lock valve controls the transmission-internal, controllable clutch for the transmission-side power-take-off.

7. The transmission according to claim 6, wherein a hydraulic oil line, by way of which the transmission-internal, controllable clutch for the transmission-side power-take-off is supplied with hydraulic oil, is formed in a direction toward the transmission-internal, controllable clutch, in part by a hydraulic duct of the duct plate and, in part by a hydraulic duct of the transmission housing.

8. The transmission according to claim 7, wherein the hydraulic oil line, by way of which the transmission-internal, controllable clutch for the transmission-side power-take-off is supplied with hydraulic oil, extends, starting from the transmission housing, in a direction toward either a cover or a centering plate of the transmission.

9. The transmission according to claim 7, wherein the hydraulic oil line, by way of which the transmission-internal, controllable clutch for the transmission-side power-take-off is supplied with hydraulic oil, runs in sections within an oil space delimited by the transmission housing and an oil sump, in which the hydraulic control unit is arranged.

10. The transmission according to claim 1, wherein the transmission is void of a parking lock and comprises a parking brake.

11. A transmission of a motor vehicle, the transmission comprising:
- a transmission housing having hydraulic ducts and accommodating a plurality of shifting elements;
- a hydraulic control unit supplying hydraulic oil to the shifting elements of the transmission and comprising a valve housing and a duct plate;
- the valve housing of the hydraulic control unit accommodating a plurality of valves;
- the duct plate of the hydraulic control unit being connected to the transmission housing and having further hydraulic ducts which communicate with the hydraulic ducts of the transmission housing to facilitate a flow of the hydraulic oil to the shifting elements of the transmission, via the further hydraulic ducts of the duct plate and the hydraulic ducts of the transmission housing:
- a power-take-off being housed within the transmission housing and facilitating a flow of mechanical power from the transmission;
- a controllable clutch, located within the transmission housing, being controllably engageable to couple a transmission shaft to the power-take-off to direct the flow of mechanical power to the power-take-off; and
- the controllable clutch being actuatable by a supply of the hydraulic oil from the hydraulic control unit.

* * * * *